(12) United States Patent
Bousquet et al.

(10) Patent No.: US 9,396,662 B2
(45) Date of Patent: Jul. 19, 2016

(54) METHOD AND DEVICE FOR DETERMINING THE RISK OF COLLISION ON THE GROUND OF AN AIRCRAFT

(71) Applicant: AIRBUS OPERATIONS (SAS), Toulouse (FR)

(72) Inventors: Fabrice Bousquet, Toulouse (FR); Guillaume Le Berre, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 19 days.

(21) Appl. No.: 14/223,145

(22) Filed: Mar. 24, 2014

(65) Prior Publication Data

US 2014/0288815 A1 Sep. 25, 2014

(30) Foreign Application Priority Data

Mar. 25, 2013 (FR) ...................................... 13 52646

(51) Int. Cl.
| | | |
|---|---|---|
| *G08G 5/04* | (2006.01) | |
| *G08G 5/06* | (2006.01) | |
| *B64D 45/00* | (2006.01) | |
| *G08G 5/00* | (2006.01) | |

(52) U.S. Cl.
CPC ......... *G08G 5/04* (2013.01); *B64D 45/00* (2013.01); *G08G 5/0078* (2013.01); *G08G 5/06* (2013.01); *G08G 5/065* (2013.01)

(58) Field of Classification Search
CPC .............. G08G 5/0078; G08G 5/0043; G08G 5/0017–5/0021; G08G 5/0065; G08G 5/0073; G08G 5/0095; G08G 5/04–5/065; G08G 9/00–9/02; B64D 45/00; B64D 45/0005; B64D 2045/0095; G01C 21/10; G01C 23/00–23/005; G05D 1/0083
USPC .................. 701/301, 120, 3, 10, 14–16, 300; 340/971, 961, 963, 983; 342/29
See application file for complete search history.

(56) References Cited

U.S. PATENT DOCUMENTS

| | | | |
|---|---|---|---|
| 6,480,120 B1 * | 11/2002 | Meunier ........................ 340/970 |
| 7,881,867 B2 * | 2/2011 | Lorido et al. ................. 701/301 |
| 8,125,352 B2 * | 2/2012 | Dubourg et al. ............. 340/980 |
| 2005/0174350 A1 * | 8/2005 | Ridenour et al. ............ 345/440 |
| 2006/0287829 A1 * | 12/2006 | Pashko-Paschenko ....... 701/301 |
| 2007/0050101 A1 * | 3/2007 | Sacle et al. ..................... 701/11 |
| 2007/0067093 A1 | 3/2007 | Pepitone |
| 2007/0174005 A1 * | 7/2007 | Bitar et al. .................... 701/211 |
| 2011/0210871 A1 * | 9/2011 | Flotte et al. .................. 340/961 |
| 2011/0233331 A1 * | 9/2011 | Frings et al. .............. 244/114 R |

(Continued)

FOREIGN PATENT DOCUMENTS

FR   2 891 644   4/2007

*Primary Examiner* — Bao Long T Nguyen
(74) *Attorney, Agent, or Firm* — Nixon & Vanderhye P.C.

(57) ABSTRACT

This method of determining the risks of collision of an aircraft (1) when travelling on the ground comprises the steps of:
- determining the path of at least one of several parts to protect of the aircraft (1),
- determining a protection volume ($V_R$, $V_P$) associated with said at least one of several parts to protect of the aircraft, in which the shape in a horizontal plane of said protection volume depends on said path of said at least one of several parts to protect,
- detecting an object entering said protection volume, and
- generating a warning in response to detecting said object.

19 Claims, 2 Drawing Sheets

(56) References Cited

U.S. PATENT DOCUMENTS

| | | | |
|---|---|---|---|
| 2012/0123671 A1* | 5/2012 | Oberti et al. | 701/301 |
| 2012/0200433 A1 | 8/2012 | Glover et al. | |
| 2013/0110323 A1* | 5/2013 | Knight | 701/3 |
| 2013/0321176 A1* | 12/2013 | Vasek | G08G 5/04 340/945 |

* cited by examiner

METHOD AND DEVICE FOR DETERMINING THE RISK OF COLLISION ON THE GROUND OF AN AIRCRAFT

The invention concerns a method of determining the risk of collision of an aircraft when it is traveling on the ground and a device for the implementation of that method.

In airports, aircraft must pass among numerous obstacles when they leave the runway or the gate or location for boarding/disembarking of passengers or freight. There may therefore be risks of collision between the aircraft and those obstacles, in particular for aircraft of large size. These risks must be minimized.

The real cost of a collision of an aircraft on the ground is much greater than the cost of the repairs to the aircraft alone: the re-scheduling of the flight, possible accommodation of the passengers at a hotel if a substitution flight is not available, communication operates required due to the impact that such an incident may have on the public image of the airline company, representing high costs.

There is a need to reduce such collision risks as much as possible by equipping aircraft with avionic devices enabling the pilots to be assisted during the phases of traveling on the ground.

A device is known from document US-2007/0670093 for preventing collision risks of an aircraft when traveling on the ground. According to this device, one or more zones are generated for protection of the aircraft in relation to possible obstacles. The dimensions of a protection zone depend on the size of the aircraft. The shape of a protection zone may depend on different factors such as the radius of rotation of the wings, the nose and the tail of the aircraft, the speed on the ground forward or backwards, the steering of the aircraft when turning and an early warning distance "x" which may change depending on the data relative to the aircraft. An alarm is generated in case of incursion into a protection zone of the aircraft of another protection zone belonging to another aircraft or to an item of airport equipment.

The invention aims to provide a method which enables the collision risks of an aircraft when traveling or taxiing on the ground to be determined with increased precision and safety and consequently to lighten the workload of the persons in charge of guiding the aircraft during such a phase.

To that end, the invention is directed to a method of determining the risks of collision of an aircraft when traveling on the ground, comprising the steps of:
  determining the path of at least one of several parts to protect of the aircraft,
  determining a protection volume associated with said at least one of several parts to protect of the aircraft, in which the shape in a horizontal plane of said protection volume depends on said path of said at least one of several parts to protect,
  detecting an object entering said protection volume, and generating a warning in response to detecting said object.

This method makes it possible to perform monitoring of the potential obstacles for the aircraft that is dynamic, that is to say which depends on its path and which is not simply static, by means of protection volumes each having a shape in a horizontal plane which is directly linked to the path of a specific part to protect of the aircraft. Thus, protection volumes of different specific shapes correspond to different parts to protect of the aircraft. These protection volumes having shapes differentiated according to the parts of the aircraft to protect make it possible to apprehend the real risks of collision substantially more precisely than in the case of an overall protection zone for the aircraft as a whole. Safety is thereby increased.

According to another possible feature of the invention, the length in a horizontal plane of said protection volume is determined according to the velocity of said at least one of several parts to protect of the aircraft. Thus, not only the shape, but also the length in a horizontal plane of the protection volume or volumes are directly linked to the velocity vector of the part to protect of the aircraft, which is also an assurance of safety.

According to another possible feature of the invention, said path of said at least one of several parts to protect of the aircraft and said length of said volume are curved. The protection volumes have a curved shape when the aircraft is turning, which frees the pilot from having to spatially apprehend the aircraft and its external environment in a phase of guiding on the ground which requires his full attention.

According to another possible feature of the invention, said at least one of several parts to protect of the aircraft comprises at least one from among the ends of the wings, the engines of the aircraft, a rear horizontal plane, a vertical plane (the fin) and a landing gear. These parts of the aircraft which are particularly vulnerable and of low visibility or not visible for the pilot in course of maneuvering are thus effectively protected against the collision risks.

According to a possible feature of the invention, determining at least one protection volume comprises generating:
  a reaction volume in which a detected object is an imminent obstacle, and
  a prediction volume in which a detected object is a potential obstacle.

This distinction between a reaction volume in which a detected obstacle is close or imminent and a prediction volume in which a detected object is a potential obstacle enables the information supplied to the pilot to be hierarchized.

According to another possible feature of the invention, said length of the reaction volume is determined according to the velocity of said at least one of several parts to protect, estimations of data processing time and reaction time of the pilot of the aircraft, and the braking distance of the aircraft. The length of the reaction volume is determined by taking into account the essential parameters which are involved in avoiding a collision in the presence of an imminent obstacle, which is an assurance of safety.

According to another feature of the invention, the length of the prediction volume is determined according to the length of the reaction volume and a decision distance which depends on the velocity of the aircraft and an estimation of a time for decision taking by the pilot. The taking into account of a decision distance for determining the length of the prediction volume makes it possible to give the pilot advanced warning of potential risks of collision and improves his knowledge of the environment.

The invention also relates to a device for determining collision risks of an aircraft when traveling on the ground comprising
  at least one detector for detecting an object liable to constitute an obstacle for at least one of several parts to protect of said aircraft, and
  a computer arranged for
    determining, for said at least one of several parts to protect of the aircraft, a protection volume of which the shape in a horizontal plane depends on the path of said at least one of several parts to protect, and
    for generating a warning in response to the detection by said detector of an object in said protection volume.

The device for implementing the above method only requires a limited number of components which are of low cost.

According to another possible feature of the invention, said computer is arranged to determine the length of said volume in a horizontal plane according to the velocity of said at least one of several parts to protect of the aircraft.

Lastly, the invention also relates to an aircraft equipped with a device as defined above for determining collision risks.

Other features and advantages of the invention will become apparent from the following description of embodiments which are given solely by way of example and illustrated by the appended drawings in which.

Figure 1:
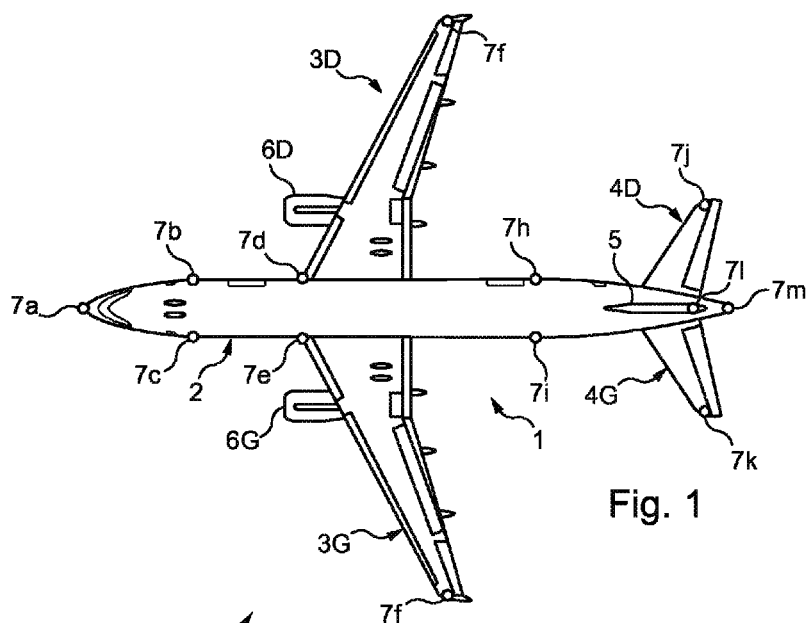
FIG. 1 is a diagrammatic plan view from above of an aircraft equipped with proximity sensors.

Based on FIG. 1, an aircraft 1 comprises a fuselage 2, right 3D and left 3G wings, right 4D and left 4G horizontal tail planes and a vertical tail fin 5. In the illustrated example, the aircraft comprises two engines, for example jet engines, namely an engine 6D disposed under the right wing 3D and the other 6G disposed under the left wing 3G. As a variant, the aircraft could comprise a number of engines different from two, which may or may not be disposed under the wings.

The aircraft 1 is equipped with a certain number of proximity sensors 7 disposed at different locations of the aircraft 1. Thus the aircraft comprises:

a sensor 7a disposed in the nose of the fuselage 2, two sensors 7b and 7c disposed in the neighborhood of the front part of the fuselage, on opposite sides thereof, but to the rear of the cockpit, two sensors 7d and 7c disposed on opposite sides of the fuselage, in the neighborhood of the root of the wings 3D and 3G on the fuselage 2, adjacent the leading edge of the wings;

two sensors 7f and 7g respectively disposed at the ends of the wings 3D and 3G;

two sensors 7h and 7i disposed on opposite sides of the fuselage 2, in a rear zone thereof;

two sensors 7j and 7k respectively disposed at the ends of the right 4D and left 4G horizontal tail planes;

a sensor 7l disposed in the neighborhood of the upper part of the vertical tail fin 5; and a sensor 7m disposed at the rear of the fuselage 2.

The number and the location of the proximity sensors 7 are only given by way of example and may vary depending on the geometry of the aircraft, the number and location of the prediction volumes chosen, etc.

The proximity sensors 7 are adapted to enable obstacles to be detected to the front and at the sides of the aircraft. They are for example sensors of radar, lidar, ultrasound, or laser type, or of any other technology type capable of performing the detection of obstacles.

The information collected by the proximity sensors 7 are processed by a computer on board the aircraft as described in more detail with reference to FIG. 7, in order to determine the geographical position of possible obstacles relative to the aircraft when the latter is traveling or taxiing on the ground, under its own power or with the assistance of external machines. As a variant, the collected information may be processed directly at the location of the sensors in the case of so-called "smart" sensors.

This information comprises at least a horizontal location (distance and azimuth) of an detected obstacle relative to the proximity sensor concerned. As a variant, one or more proximity sensors also provide elevation and velocity vector information on an obstacle relative to the sensor concerned.

Knowing the positions of the proximity sensors on the aircraft and the relative positions of the sensors and of the obstacles, changes in references enable the obstacles to be located relative to the aircraft.

As will be explained in more detail below, in accordance with the invention protection volumes linked to parts of the aircraft 1 are defined and the information provided by the sensors 7 make it possible to determine whether an obstacle or obstacles are situated within those protection volumes.

When the aircraft moves or is moved on the ground, that is to say travels substantially horizontally, the main parts of the aircraft to protect are parts of the fuselage or parts that jut from the fuselage that the pilot cannot see from the cockpit. These are in particular not only the ends of the wings 3D, 3G and of the engines 6D, 6G, but also where appropriate the horizontal tail plane, the vertical plane (the fin) and the landing gear or landing rears.

For each end of the wings 3D and 3G a reaction volume $V_R$ and a prediction volume $V_P$ are defined. These protection volumes, considered in a horizontal plane, may be rectilinear (square or rectangular for example) or curved (annular sections for example) depending on whether the aircraft is moving forward in a straight line or along a curve or turn. To be precise, the rectilinear or curved length of a protection volume depends on the velocity of the part of the aircraft associated with that volume.

A reaction volume $V_R$ is a volume in which an imminent obstacle is detected, that is to say an obstacle with which a collision could occur after a short time.

A prediction volume $V_P$ is a volume in which an imminent obstacle is detected, that is to say an obstacle with which a collision risk potentially exists but is not immediate.

Figure 2:
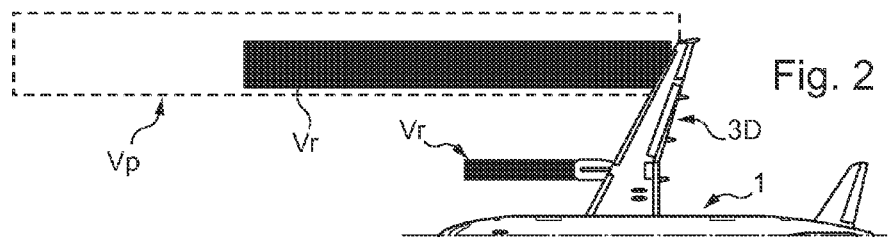
FIG. 2 is a partial diagrammatic plan view from above of an aircraft which shows, in horizontal projection, protection volumes defined for said aircraft traveling forwards on the ground in a straight line.

FIG. 2 illustrates the cross-section, in a horizontal plane parallel to the Plane XX'-YY', of the reaction and prediction volumes $V_R$ and $V_P$ for the end of the right wing 3D of the aircraft 1, the aircraft being on the ground and moving substantially horizontally in a straight line. The reaction and prediction volumes $V_R$ and $V_P$ for the end of the left wing 3G have not been represented but are identical to those of the right wing 3D when the aircraft moves in a straight line.

Figure 3:
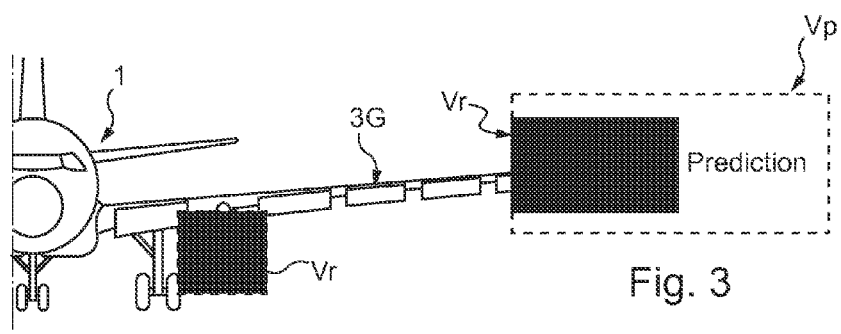
FIG. 3 is a partial diagrammatic view in front elevation of an aircraft which shows, in vertical projection, the protection volumes of FIG. 2

FIG. 3 illustrates, for the left wing 3G, the cross-section in a vertical plane parallel to the axis YY' of the reaction and prediction volumes $V_R$ and $V_P$ for the end of the wing (the aircraft being on the ground on a substantially horizontal plane). These cross-sections are identical for the right wing 3D when the aircraft 1 moves in a straight line. The geometry and the area of the cross-section, in the aforementioned vertical plane, for those reaction and prediction volumes $V_R$ and $V_P$ are matters of choice for the person skilled in the art. The length or longitudinal extent of those reaction and prediction volumes $V_R$ and $V_P$ in a horizontal plane parallel to the plane XX'-YY' is determined as will be describe below.

Figure 4:
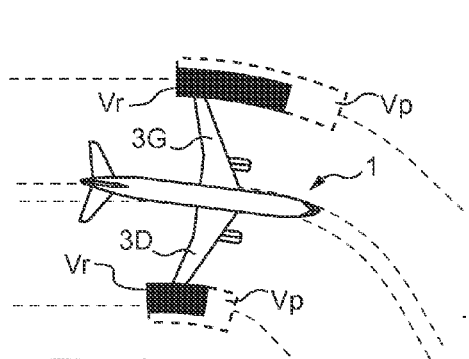
FIG. 4 is a similar view to FIG. 2 showing protection volumes defined for said aircraft performing a turn while traveling forwards on the ground.

FIG. 4 illustrates those same reaction and prediction volumes $V_R$ and $V_P$ in cross-section in a horizontal plane for the wing ends when the aircraft 1 performs a turn to the right. The reaction and prediction volumes $V_R$ and $V_P$ for the end of the left wing 3G have a curved extent much greater than that of the corresponding volumes of the right wing 3D, due to the difference in speed between those ends which is due to the rotation of the aircraft 1.

For the engines 6D and 6G, only the reaction volume $V_R$ is determined as represented in cross-section in a horizontal plane in FIG. 2 and in a vertical plane in FIG. 3. Whatever the motion of the aircraft (rectilinear or curved movement), the reaction volume $V_R$ of an engine extends straight ahead. To be precise, it turns out that the risks of collision of an obstacle with the engines exist mainly in the phase of arrival of the aircraft at the aircraft stand, when its velocity is low and it is moving ahead practically in a straight line. Furthermore, on account of the proximity of the fuselage, curved protection volumes might intersect with the fuselage. The length of the reaction volume $V_R$ for an engine under a wing undergoes the same change as the length of the reaction volume $V_R$ for the protection of the end of that wing, without extending beyond the aircraft nose. This choice is based on the fact that it is considered that beyond the aircraft nose, the pilots are able to see the objects on their path.

In order to determine the length or extension, in horizontal cross-section, of the protection volumes $V_R$ and $V_P$ a certain number of parameters come into play.

A first of these parameters is the processing time, which corresponds to the time that the processing system (comprising the sensors 7, the computer or computers for processing the data coming from those sensors, and the associated alarm device or devices required for detecting an obstacle and generating a warning.

The processing time enables a processing distance to be determined:

$$D_{processing} = (\text{processing time}) \times (\text{initial velocity})$$

in which the "initial velocity" is the instantaneous velocity of the front landing gear of the aircraft. On rectilinear paths, this is equal to the instantaneous velocity of the part of the aircraft considered. On curved paths, it is still the velocity of the main landing gear that is considered for the computation of the $D_{processing}$, but a corrective factor is applied as described below.

The reaction distance of the pilot $D_{reaction}$ is:

$$D_{reaction} = (\text{pilot reaction time}) \times (\text{initial velocity})$$

in which "initial velocity" is the same as previously and the "pilot reaction time" is the estimated time taken by the pilot, from the time at which a warning is issued, to concentrate on the information provided by the collision prediction device.

The decision distance $D_{decision}$ is:

$$D_{decision} = (\text{decision time}) \times (\text{initial velocity})$$

in which "initial velocity" is the same as previously, and "the decision time" is the estimated time taken by the pilot to evaluate what maneuver, if any action is judged necessary, should be carried out to deal with an obstacle detected in the prediction volume.

The braking distance $D_{braking}$ is:

$$D_{braking} = (\text{initial velocity})^2 \times (2 \times \text{braking deceleration})$$

in which "initial velocity" is the same as previously.

The length of the reaction volume is, in the case of rectilinear movement:

$$L_{reaction, rectilinear} = D_{processing} + D_{reaction} + D_{braking}$$

The length of the prediction volume is, in the case of rectilinear movement:

$$L_{prediction, rectilinear} = D_{processing} + D_{reaction} + D_{decision} + D_{braking}$$

Possible lengths of reaction and prediction volumes $V_R$ and $V_P$ according to velocity are given below by way of example:

| Velocity (in knots) | Reaction volume length (in meters) | Prediction volume length (in meters) |
| --- | --- | --- |
| 5 knts | 10 m | 15 m |
| 10 knts | 20 m | 30 m |
| 15 knts | 35 m | 50 m |
| 20 knts | 55 m | 75 m |
| 25 knts | 75 m | 100 m |
| 30 knts | 100 m | 130 m |

When the aircraft is turning, two wing end velocities must be considered since the paths and velocity vectors of those two ends are different.

Figure 5:
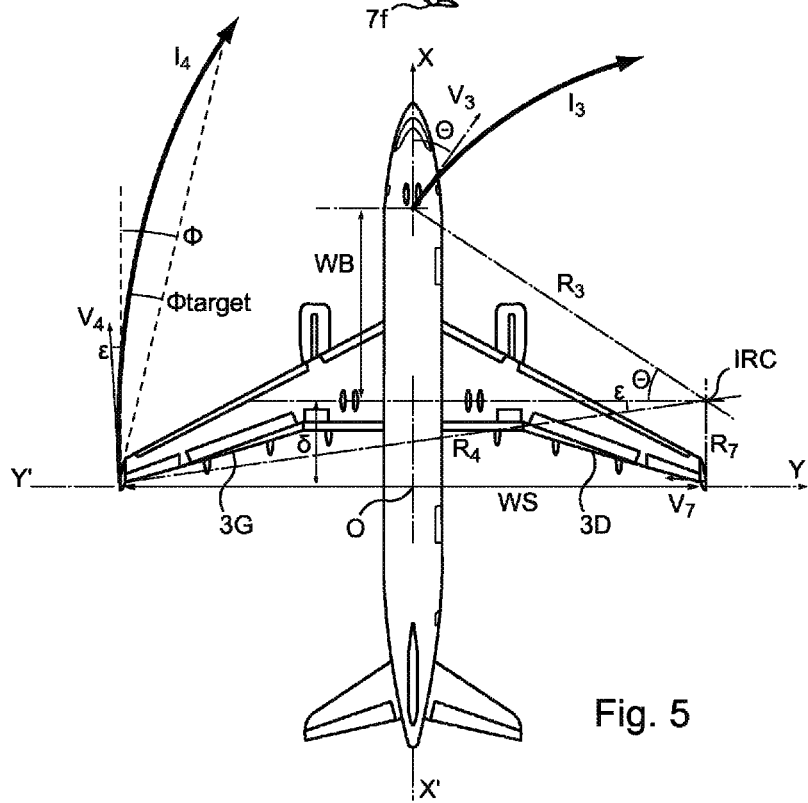
FIG. 5 is a diagrammatic plan view from above of an aircraft illustrating various parameters involved in the calculation of protection volumes.

A way of computing these wing end velocities when turning will be described below with reference to FIG. 5. In that FIG. 5, the aircraft 1 is represented in a view from above with reference to a coordinate system having orthogonal axes X, Y, Z in which the axis XX' is a median longitudinal axis of the aircraft, the axis YY' is an axis perpendicular to the axis XX' and which passes via the ends of the wings 3D, 3G of the aircraft and the axis ZZ' (not shown) is perpendicular to the axes XX' et YY'.

In this Figure:

$\theta$ is the angle of rotation of the aircraft at the location of its front landing gear;

WB is the distance, parallel to the axis XX', between the axis of the front landing gear and the axis of the rear landing gears;

WS is the distance between the ends of the wings 3D and 3G, considered along the axis YY';

$\delta$ is the distance between the line joining the ends of the wings 3D and 3G and the axis of the rear landing gears;

IRC is the instantaneous center of rotation of the aircraft;

$R_3$ is the radius of rotation of the front landing gear around the instantaneous center of rotation IRC, and is equal to:

$$R_3 = \frac{WB}{\sin\theta}$$

$V_3$ is the velocity vector of the front landing gear of the aircraft, which is close to the "aircraft velocity" indicated to the pilot by the on-board instruments;

$l_3$ is the length of the curved path of the front landing gear;

$V_4$ is the velocity vector of the end of the outside wing 3G to take into consideration in determining the reaction and prediction volumes $V_R$ and $V_P$ that are associated with that outside wing end 3G:

$$V_4 = \frac{R_4}{R_3} \cdot V_3$$

$l_4$ is the length of the curved path of the end of the outside wing 3G:

$$l_4 = \frac{R_4}{R_3} \cdot l_3$$

The length of the reaction and prediction volumes $V_R$ and $V_P$ which are associated with that outside wing 3G are:

$$L_{reaction,4} = \frac{V_4}{V_3} \cdot L_{reaction,rectilinear}$$

$$L_{prediction,4} = \frac{V_4}{V_3} \cdot L_{prediction,rectilinear}$$

$V_7$ is the velocity vector of the end of the inside wing 3D, which is taken into consideration in determining the reaction and prediction volumes $V_R$ and $V_P$ that are associated with that inside wing 3D:

$$V_7 = \frac{R_7}{R_3} V_3$$

The length of the reaction and prediction volumes $V_R$ and $V_P$ which are associated with that inside wing 3D are:

$$L_{reaction,7} = \frac{V_7}{V_3} \cdot L_{reaction,rectilinear}$$

$$L_{prediction,7} = \frac{V_7}{V_3} \cdot L_{prediction,rectilinear}$$

$R_4$ is the radius of rotation of the outside wing end 3G around the instantaneous center of rotation IRC and is equal to:

$$R_4 = \sqrt{\delta^2 + \left(\frac{WB}{\tan\theta} + \frac{WS}{2}\right)^2}$$

$R_7$ is the radius of rotation of the inside wing end 3D around the instantaneous center of rotation IRC and is equal to:

$$R_7 = \sqrt{\delta^2 + \left(\frac{WB}{\tan\theta} - \frac{WS}{2}\right)^2}$$

$\epsilon$ is the angle formed by the radius $R_4$ with the axis of the rear landing gears;

$\phi$ is the angle made by the velocity vector $V_4$ of the outside wing 3G end with the chord subtending the path of length $l_4$ of that end:

$$\varphi = \frac{l_3}{2R_3}$$

$\phi_{target}$ is the angle of the curvature of the protection volume of the outside wing end 3G, that is to say the angle between a line parallel to the axis XX' passing through that end and the chord subtending the path of length $l_4$ of that end:

$$\phi_{target} = \phi - \epsilon$$

The curved length $l_4$ and the angle $\phi_{target}$ thus determine the curved path of the outside wing end 3G. The curvature of this path is that which is given to the reaction and prediction volumes $V_R$ and $V_P$.

Figure 7:
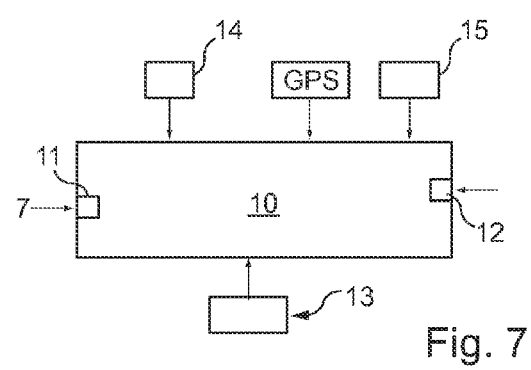
FIG. 7 is a block diagram illustrating a device for predicting collision according to the invention.

As represented in FIG. 7, the aircraft 1 comprises a computer 10 which receives on one or more inputs 11 the signals issued by the proximity sensors 7. At 12 the computer 10 also receives an item of information relative to the velocity of the aircraft, which substantially corresponds to the velocity $V_3$ as indicated previously, and the angle θ of rotation of the aircraft at the location of its front landing gear. The computer 10 has in memory all the dimensional data of the aircraft 1 in order to enable it to compute the curved lengths and the angles $\phi_{target}$ which determine the curved paths of the wing ends 3D and 3G when the aircraft is turning.

Protection volumes may also be generated at the time of the reversing phases of the aircraft for certain parts thereof provided with one or more appropriate sensors.

Figure 6:
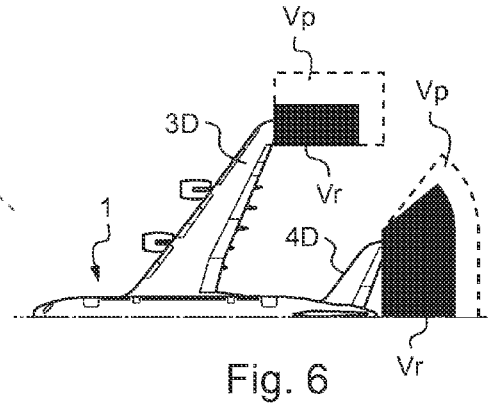
FIG. 6 is a similar view to FIG. 4 showing protection volumes defined for said aircraft performing a reversing maneuver.

The half-view in FIG. 6 shows such a situation for the prediction volume $V_P$ and reaction volume $V_R$ that are respectively associated with the right wing end 3D and the right horizontal rear fin 4D of the aircraft 1. The left part of the aircraft relative to a plane XX'-ZZ' has not been represented in the drawing, but prediction and reaction volumes are also respectively associated with the left wing end 3G and the left horizontal rear tail 4G. These different protection volumes in reversing phase are determined in similar manner to that described above for the ends of the wings 3D and 3G when the aircraft is moving forward on the ground.

Even if in principle an aircraft does not move under its own power during the reversing phases, the detection of objects may be useful to the pilot. Such detection would be of particular value in the case of aircraft with motor-driven wheels capable of performing a reversing maneuver autonomously.

The computer 10 is connected to appropriate audio and/or visual warning devices 13, to warn the pilot in case of detection of an obstacle in the reaction volume $V_R$ or prediction volume $V_P$.

The computer 10 may be connected, for example by radio, to receive information from an external distance source 14, relative to static entities (constructions, pylons, etc.) and to their location on the airport where the aircraft is traveling on the ground. Thanks to location means, for example of GPS type, the computer 10 is capable of positioning the aircraft on the map of the airport and of providing and identifying the static entities situated in the neighborhood of the aircraft.

The aircraft equipped with an ADS-B device (ADS-B standing for Automatic Dependent Surveillance Broadcast) continuously broadcast their position on the ground (obtained by GPS) and their velocity vector. Preferably, the computer 10 is equipped to receive, from a device 15 for reception of ADS-B data, dynamic information relative to other aircraft in movement at the airport.

Thus, another aircraft situated outside the protection volumes may be taken into account by the computer 10 as a future obstacle if its path is liable to cross the path of the aircraft 1.

The computer 10 may also be arranged to take into account a path on the ground computed by the avionics of the aircraft 1, for example by a ground path computing system. Such a system computes the appropriate path of the aircraft from the runway to the gate/disembarking location (or vice-versa) and communicates it to the crew and to the department responsible for traffic on the ground Thus, the computer 10 may provide the paths which the aircraft 1 will follow and thus the paths of the parts of the aircraft that must be protected.

The computer 10 may be a specific computer dedicated to determining the collision risks or an existing computer forming part of the avionics of the aircraft.

The invention claimed is:

1. A method of determining, for each part of an aircraft to be protected while the aircraft is travelling on the ground, the risks of collision, the method comprising:
    determining, for each part to be protected, a path of travel of the part to be protected while the aircraft is travelling on the ground,
    determining, for each part to be protected, a protection volume specifically associated with the part to be protected, the protection volume specifically associated with the part to be protected having a shape in a horizontal plane of the protection volume which depends on the path of the part to be protected, and the shape being different from shapes of other protection volumes specifically associated with other parts of the aircraft to be protected,
    detecting, for each part to be protected, any object entering the protection volume specifically associated with the part to be protected, and
    generating a warning in response to detecting the object.

2. The method according to claim 1, wherein, for each part to be protected, a length in the horizontal plane of the protection volume specifically associated with the part to be protected is determined according to a velocity of the part to be protected.

3. The method according to claim 2, wherein, when the aircraft is turning, for each part to be protected, the path of the part to be protected and the length of the protection volume specifically associated with the part to be protected are curved.

4. The method according to claim 1, wherein each of the parts to be protected comprises a wing of the aircraft, an engine of the aircraft, a rear horizontal plane of the aircraft, a vertical plane (the fin) of the aircraft or a landing gear of the aircraft.

5. The method according to claim 1, wherein, for each part to be protected, determining the protection volume specifically associated with the part to be protected comprises generating a reaction volume in which an object detected to be in the protection volume is an imminent obstacle to the part to be protected, and a prediction volume in which an object detected to be in the protection volume is a potential obstacle to the part to be protected.

6. The method according to claim 1, wherein parts of the aircraft to be protected constitute a plurality and wherein a plurality of protection volumes are determined, each protection volume being specifically associated with one of the plurality of the parts of the aircraft to be protected.

7. The method according to claim 1, wherein, for each part to be protected, the protection volume specifically associated with the part to be protected has a shape differentiated according to the part to be protected.

8. A method of determining the risks of collision by at least one of several parts to protect of an aircraft when travelling on the ground, the method comprising:
    determining a path of at least one of the several parts to protect of the aircraft,
    determining a protection volume specifically associated with the at least one of several parts to protect of the aircraft, in which a shape in a horizontal plane of the protection volume depends on the path of the at least one of several parts to protect, each of the several parts to protect of the aircraft having a specifically associated protection volume that is different from other protection volumes specifically associated with other parts to protect of the aircraft,
    detecting an object entering the protection volume, and
    generating a warning in response to detecting the object,
    wherein determining at least one protection volume comprises generating a reaction volume in which a detected object is an imminent obstacle, and a prediction volume in which a detected object is a potential obstacle, and
    wherein a length of the reaction volume is determined according to a velocity of the at least one of several parts to protect of the aircraft, estimations of data processing time and reaction time of the pilot of the aircraft, and a braking distance of the aircraft.

9. The method according to claim 8, wherein a length of the prediction volume is determined according to the length of the reaction volume and a decision distance which depends on a velocity of the aircraft and an estimation of a time for decision taking by a pilot.

10. A device for determining, for each part of an aircraft to be protected while the aircraft is travelling on the ground, the risks of collision, the device comprising:
    for each part to be protected, a detector for detecting an object liable to constitute an obstacle for the part to be protected, and
    a computer arranged for determining, for each part to be protected, a path of travel of the part to be protected while the aircraft is travelling on the ground and a protection volume specifically associated with the part to be protected and having a shape in a horizontal plane which depends on the path of the part to be protected, and for generating a warning in response to any detection by the detector of an object in the protection volume specifically associated with the part to be protected, the shape of the protection volume specifically associated with the part to be protected being different from shapes of other protection volumes specifically associated with other parts of the aircraft to be protected.

11. The device according to claim 10, wherein the computer is arranged to determine, for each part to be protected, a length of the volume in the horizontal plane of the protection volume specifically associated with the part to be protected according to a velocity of the part to be protected.

12. An aircraft comprising a device for determining collision risks according to claim 11.

13. The device according to claim 11, wherein, for each part to be protected, determining the protection volume specifically associated with the part to be protected comprises generating a reaction volume in which an object detected to be in the protection volume is an imminent obstacle to the part to be protected, and a prediction volume in which an object detected to be in the protection volume is a potential obstacle to the part to be protected.

14. An aircraft comprising a device for determining collision risks according to claim 10.

15. The device according to claim 10, wherein parts of the aircraft to be protected constitute a plurality and wherein a plurality of protection volumes are determined by the computer, each protection volume being specifically associated with one of the plurality of the parts of the aircraft to be protected.

16. The device according to claim 10, wherein, for each part to be protected, the protection volume specifically determined for the part to be protected has a shape differentiated according to the part of the aircraft to be protected.

17. A method of determining the risks of collision by a plurality of parts to protect of an aircraft when travelling on the ground, the method comprising:

determining a path for each of the plurality of parts to protect of the aircraft, determining for each of the plurality of parts to protect of the aircraft a protection volume specifically associated with the part to protect, in which a shape in a horizontal plane of the specifically associated protection volume depends on the path of the part to protect, the determining of the specifically associated protection volume comprising generating a reaction volume for the specifically associated protection volume in which a detected object is an imminent obstacle, and a prediction volume for the specifically associated protection volume in which a detected object is a potential obstacle, each of the plurality of parts to protect of the aircraft having a specifically associated protection volume, the shape of which being different from protection volumes' shapes specifically associated with other parts to protect of the aircraft, detecting an object entering any protection volume specifically associated with any of the plurality of parts to protect of the aircraft, and generating a warning in response to detecting the object.

18. The method according to claim 17, wherein the reaction volume for the specifically associated protection volume is completely encompassed by the prediction volume for the specifically associated protection volume.

19. The method according to claim 17, wherein each specifically associated protection volume has a shape differentiated according to the protection volume's specifically associated part to protect.

\* \* \* \* \*